United States Patent [19]

Flaherty

[11] Patent Number: 4,489,976

[45] Date of Patent: Dec. 25, 1984

[54] VEHICLE BODY

[76] Inventor: B. Michael Flaherty, 8730 Ferry Rd., Grosse Ile, Mich. 48138

[21] Appl. No.: 541,868

[22] Filed: Oct. 14, 1983

Related U.S. Application Data

[63] Continuation-in-part of Ser. No. 448,299, Dec. 9, 1982, abandoned.

[51] Int. Cl.³ .............................................. B62D 31/00
[52] U.S. Cl. .................................... 296/185; 114/353; 296/15
[58] Field of Search ............... 296/185, 191, 193–196, 296/31 R, 31 P, 15; 114/343, 353, 355–377

[56] References Cited

U.S. PATENT DOCUMENTS

| 4,048,939 | 9/1977 | Jones | 114/355 |
| 4,153,290 | 5/1979 | Barenyi | 296/191 |
| 4,201,412 | 5/1980 | Williams et al. | 296/163 |
| 4,362,519 | 12/1982 | Gault | 114/353 |

Primary Examiner—Robert R. Song
Attorney, Agent, or Firm—Barnes, Kisselle, Raisch, Choate, Whittemore & Hulbert

[57] ABSTRACT

A vehicle body comprises a pair of opposite side panels and one or more rear panels, all of which are cut from flat sheet material so that the peripheral edges of all the panels are defined by straight lines. The side panels have upper and lower portions connected by straight bend lines. A floor panel extending between the side panels and additional panels along the inside of each side panel cooperate to form three triangularly shaped hollow beams extending lengthwise of the body.

24 Claims, 33 Drawing Figures

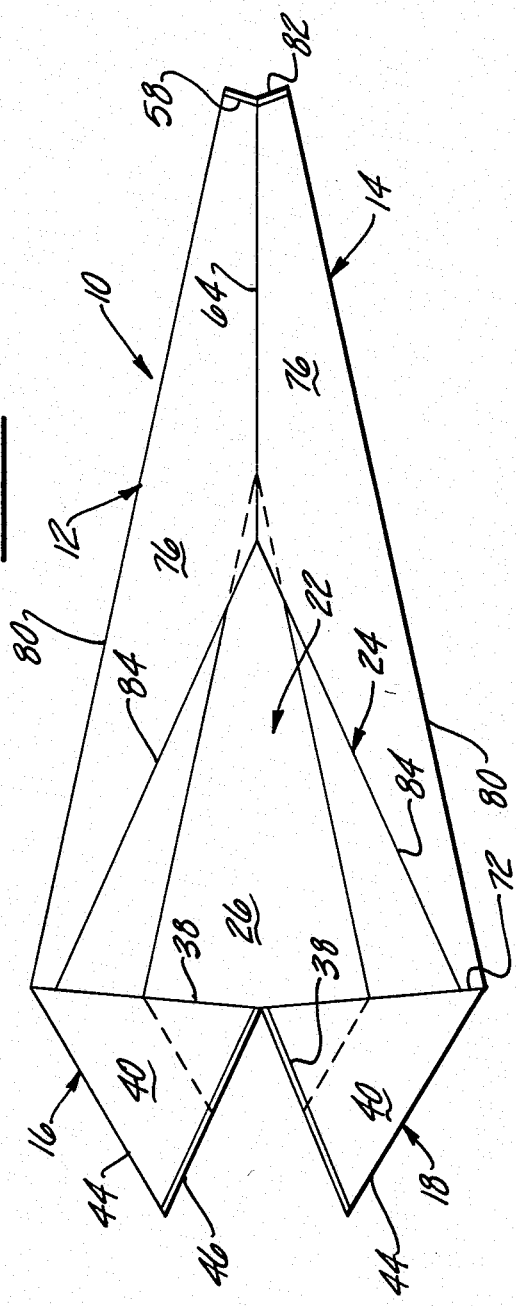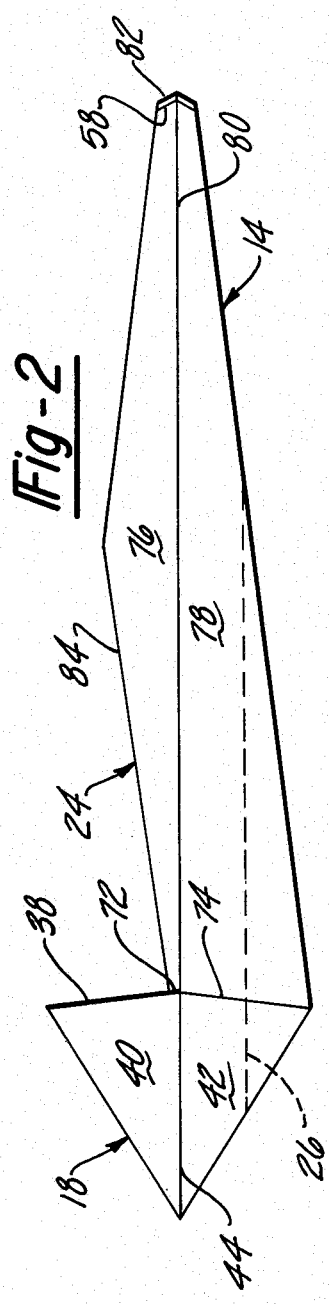

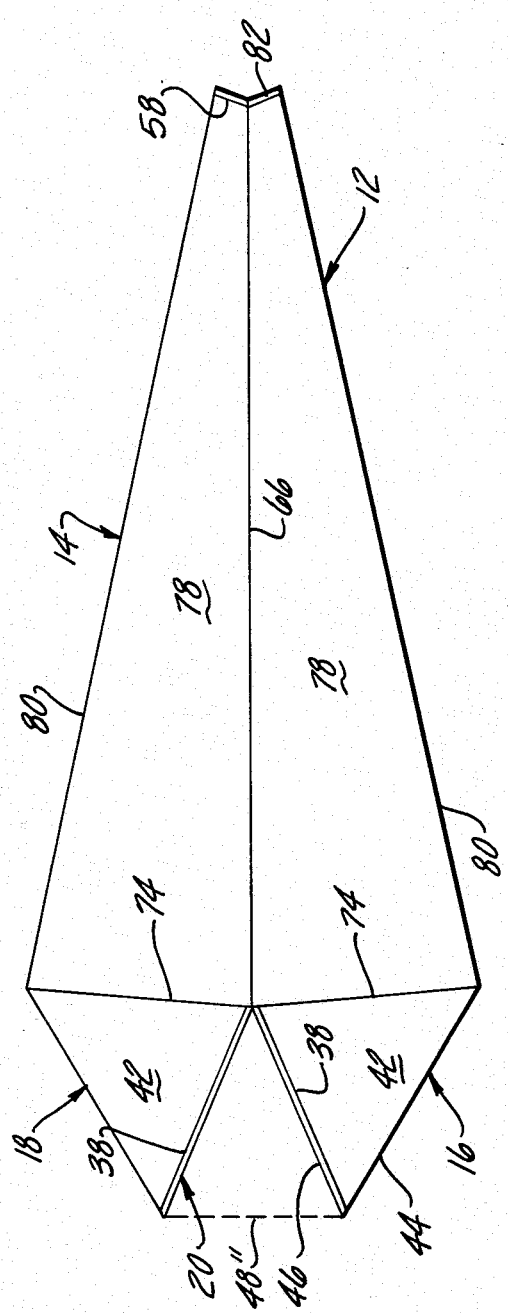
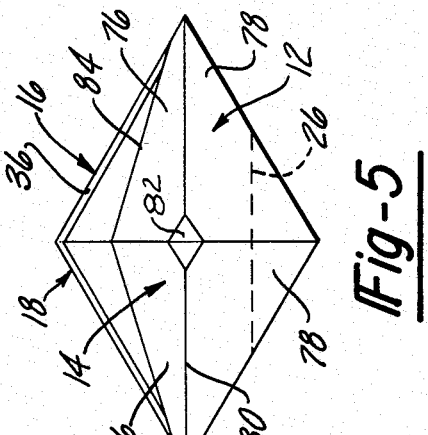
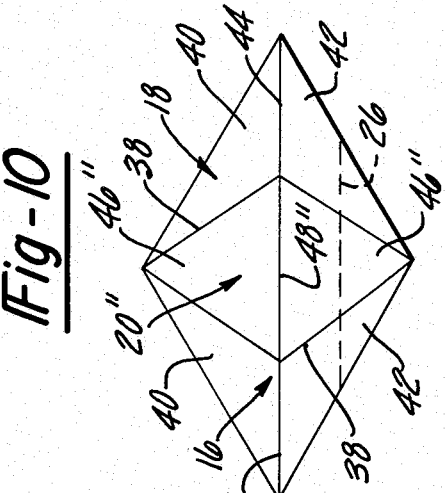
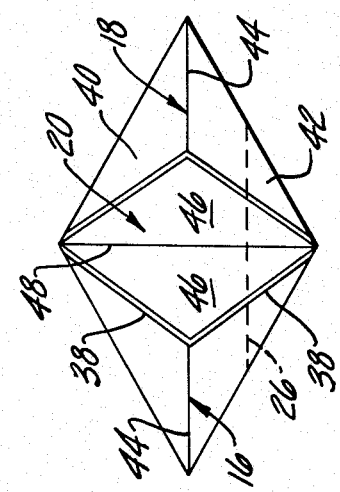

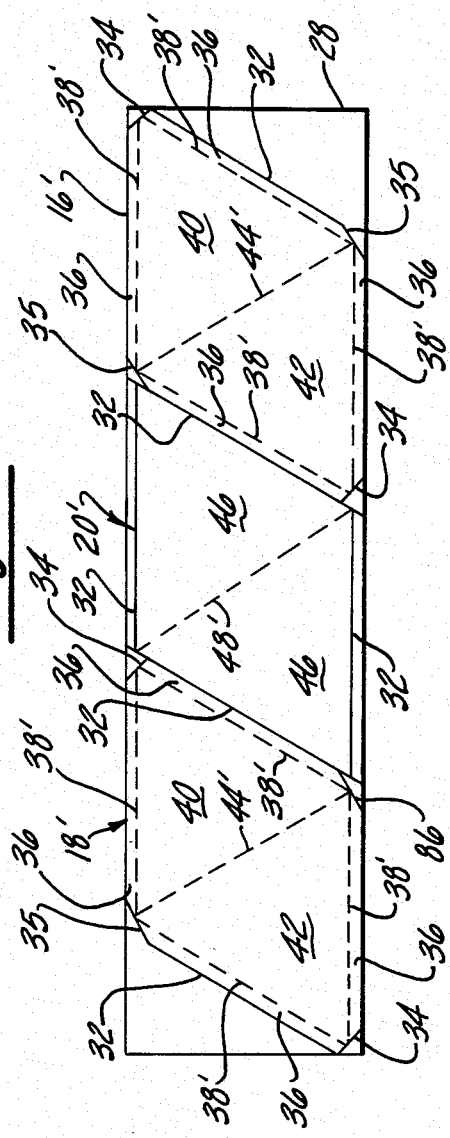
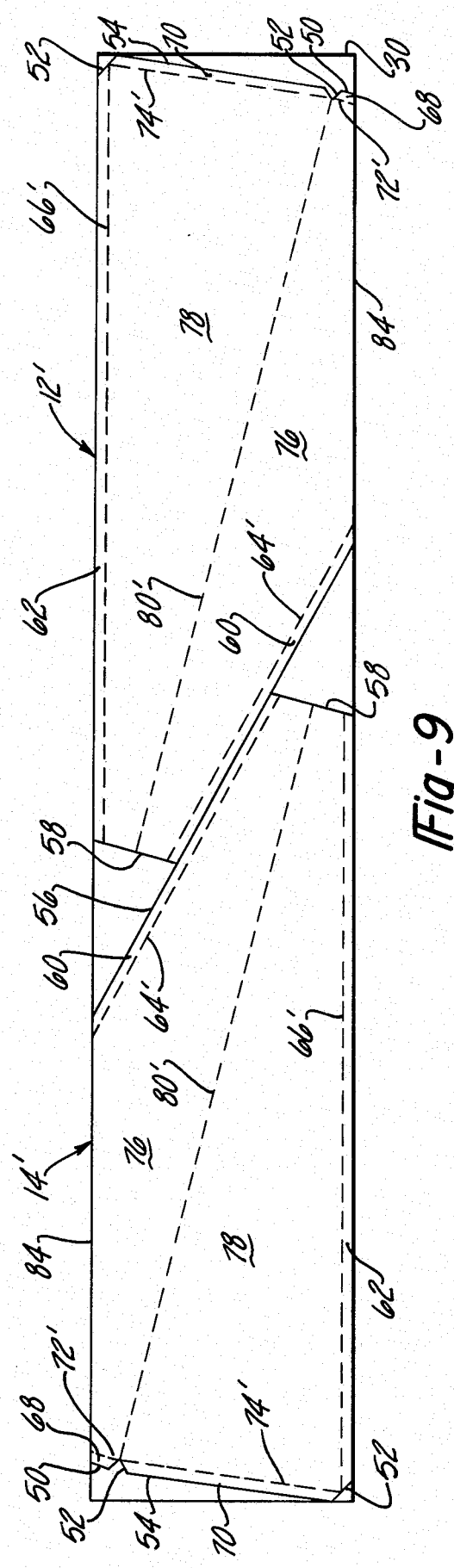

VEHICLE BODY

This application is a continuation-in-part of applicant's prior application Ser. No. 448,299, filed Dec. 9, 1982, now abandoned.

This invention relates to vehicle bodies.

Vehicle bodies, such as for automobiles, boats and the like, are very costly to fabricate because the various body panels are of such contour as to require the use of very expensive tooling, such as blanking and forming dies for sheet metal bodies and molds for plastic bodies. Such dies and molds are costly to design and costly to manufacture. The elimination of the need for such tooling reduces very considerably the cost of vehicle bodies.

The primary object of this invention is to reduce the cost of a vehicle body by utilizing a body design adapted for manufacture from sheet material without the use of the aforesaid expensive tooling; a design that enables a vehicle body to be fabricated with relatively inexpensive tools, such as drills, shears, brakes, rivet guns and welders and yet provides a superior structure.

A more specific object of this invention is to provide a vehicle body that can be fabricated from flat self-supporting sheet panels by shearing and bending the panels along straight lines and by connecting straight edges of the body panels by conventional fasteners, such as bolts, rivets, etc., or by welding or bonding.

In general, a vehicle body according to the present invention comprises a pair of interconnected, and preferably forwardly converging, side panels, each having rectilinear edges and straight horizontally extending bend lines which impart the desired strength to the panels and which impart a pleasing appearance to the body. The side panels can be connected directly together along their adjacent edges or the adjacent edges may be connected together by means of simple constructed brackets and/or by additional panels having corresponding rectilinear edges. The front end of the body can terminate in a small closure panel (in the case of a boat) or in a simple grille (in the case of an automobile). Depending upon the nature of the vehicle, the rear end of the body can be closed by a single, generally-flat panel or by several panels having straight edges and straight bend lines therein. In addition, rigidity is preferably imparted to the body by hollow triangular sheet metal beams connected to or formed integrally with the side panels of the body, the triangular beams also having straight edges and straight bends therein.

Other objects, features and advantages of the present invention will become apparent from the following description and accompanying drawings, in which:

FIG. 1 is a plan view of a vehicle body embodying this invention;

FIG. 2 is a side view of the vehicle body of FIG. 1;

FIG. 3 is a bottom view of the vehicle body of FIG. 1;

FIG. 4 is a rear view of the vehicle body of FIG. 1;

FIG. 5 is a front view of the vehicle body of FIG. 1;

FIG. 8 is a layout in the flat of the rear end panel and the back side panels of the vehicle body of FIG. 1;

FIG. 9 is a layout in the flat of the front side panels of the vehicle body of FIG. 1;

FIG. 10 is a rear view of a modification of the vehicle body of FIG. 1;

Figure 6:
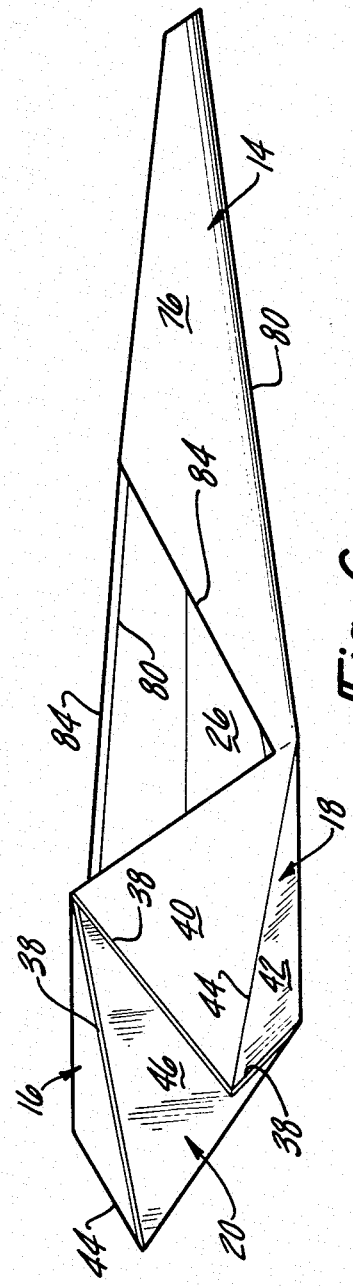
FIGS. 6 and 7 are perspective views of the vehicle body of FIG. 1.
Figure 7:
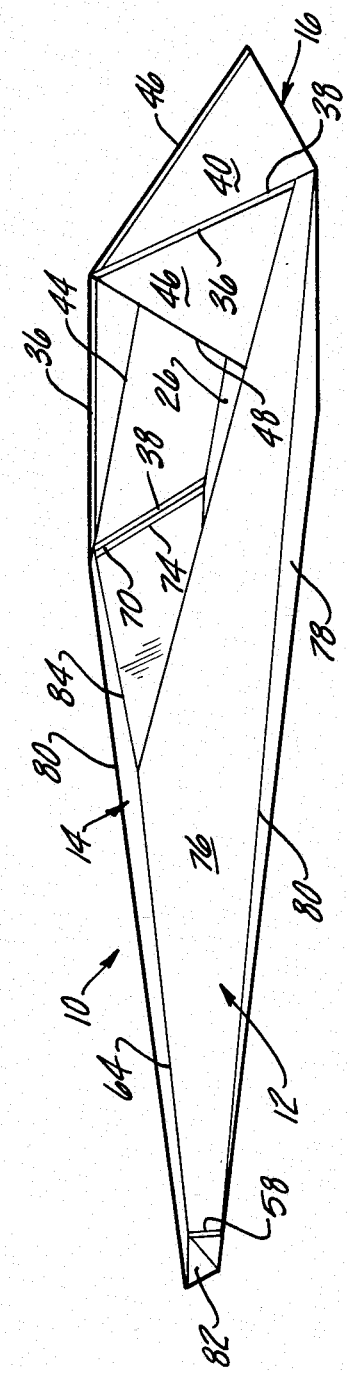

Referring in more detail to the drawings, FIGS. 1 thru 7 illustrate a vehicle body 10 embodying this invention which has left and right hand front side panels 12,14 and left and right hand back side panels 16,18. A rear end panel 20 is received between the back side panels. Preferably, the left and right hand front side panels are mirror images of each other. The body 10 has a cockpit 22 with an opening 24, and a floorboard 26 is secured to the side panels. Various openings (not shown) may be provided in the body for axles, exhaust pipes and the like.

As shown in FIGS. 8 and 9, the panels can be formed from flat and generally rectangular sheets 28,30 or from a continuous roll or coil of a self-supporting material (such as plastic, aluminum or steel). As shown in FIG. 8, the rear end panel 20 and the back side panels 16,18 can be made from flat blanks 20′,16′,18′, all cut from one flat sheet or roll of material 28. The blanks are formed by cutting or severing the sheet of material 28 along the straight lines 32,34,35 shown in solid lines in FIG. 8. This produces panels 16,18,20 bounded by rectilinear or straight edges. To facilitate securing the panels together inwardly extending flanges 36 are formed on the back side panels 16,18 by forming bends in the cut-out blanks 16′,18′along the straight lines 38′ shown in phantom. To provide each back side panel with an upper portion 40 and a lower portion 42, a bend 44 is formed in each of the blanks 16′,18′ along a straight line 44′ as shown in phantom. Similarly, the rear end panel 20 is provided with two panel portions 46 by forming a bend 48 in the blank 20′ along a straight line 48′ shown in phantom.

Similarly, the front side panels 12,14 can be made from flat blanks 12′,14′ cut from one flat sheet or roll of material 30. The blanks are made by cutting or severing sheet 30 along straight lines 50,52,54,56,58 shown in solid lines in FIG. 9. To facilitate securing the front side panels together, inwardly extending flanges 60,62 are formed by making bends 64,66 in the blanks along straight lines 64′,66′ shown in phantom. To facilitate securing the back side panels to the front side panels, inwardly extending back flanges 68,70 are formed by making bends 72,74 in the blanks along the straight lines 72′,74′ shown in phantom. To provide the front side panels 12,14 with upper and lower portions 76,78, a bend 80 is made in each blank 12′,14′ along a straight line 80′ as shown in phantom.

The left and right front side panels 12,14 can be secured together in generally opposed assembled relation by spot welding or fasteners, such as bolts and nuts inserted through the abutting flanges 60,62 adjacent the upper and lower edges. The left and right hand back side panels 16,18 can be secured in assembled relation to the front side panels by spot welding or using fasteners, such as screws or bolts and nuts inserted through the abutting flanges 36 of the back side panels and 68,70 of the front side panels. The rear end panel 20 can be secured in assembled relation to the back side panels by spot welding or screws or bolts and nuts passing through the rear end panel 20 and the abutting flanges 36 of the back side panels.

Of course, the panels can be secured together in other ways, such as by riveting, seam welding metal panels, or by fusing or bonding together plastic panels. With some means of fastening (such as seam welding or bonding) the use of flanges may be unnecessary and, if desired, they can be eliminated.

After the panels are assembled, a cover 82 (FIG. 5) is fastened to the front of the body. If the front side panels 12,14 do not have any flanges 60,62 it is possible to extend the front of these panels to essentially a point, thereby greatly reducing in size or even eliminating the need for cover 82.

The size of the cockpit opening 24 may be varied by changing the location of the edge 84 in relation to the bend 80 in the front side panels 12,14. The bends 44,80 in the side panels are preferably oriented so they extend generally horizontally when the side panels are assembled to produce body 10.

As shown in FIG. 10, the vehicle body can be modified by inserting a rear end panel 20″ between the back side panels 16,18 in the position and orientation shown in the rear view of FIG. 10 which provides more interior room in the body behind the cockpit. In this orientation of panel 20″ its bend 48″ extends generally horizontally as shown in broken lines in FIG. 3. With this arrangement, if desired, all three panels 16,18,20″ can be identical.

The vehicle body illustrated in FIGS. 11 thru 18 differs from that shown in FIGS. 1 thru 7 in that the two side panels 100,102 are formed with an additional straight bend 104 parallel to the horizontally extending straight bend line 106 between the upper and lower panel portions 108,110. The bend 104 provides a panel portion 112 which is bent along the line 114 to form a flange 116 along the free edge of the panel parallel to the bend line 104, the flange 116 being secured by suitable means to the inner face of the lower panel portion 110.

The rear end of the vehicle body of FIGS. 11 thru 15 is the same as illustrated in FIGS. 1 thru 4 and comprises the back side panels 16,18 having the rear end panel 20 received therebetween. The front edges of the two side panels 100,102 converge inwardly toward each other and terminate in spaced apart relation with a grille 118 mounted thereon and forming the front end of the body. Since the upper ends of these side panels are not connected directly together as is the case with the previous embodiment illustrated, the upper forward ends of the front side panels 100,102 are interconnected by a transversely extending, U-shaped bracket 120 having its opposite ends suitably connected to the two side panels adjacent the bend lines 104.

The floor panel 122 for the vehicle body extends the full length thereof and is connected to the two front side panels 100,102, the two back side panels 16,18 and the rear end panel 20 at the level of the flanges 116. Thus, as clearly shown in FIG. 16, the vehicle body is formed with three interconnected beams of triangular cross section which impart very substantial structural rigidity to the body. The upper portion of the body is reinforced at each side by the triangular beams formed by the panel portions 108,112 with the upper portions of the panel portions 110. The lower portion of the body is reinforced by the triangular beam formed by the floor panel 122 and the lower portion of the two panel portions 110.

Figure 19:
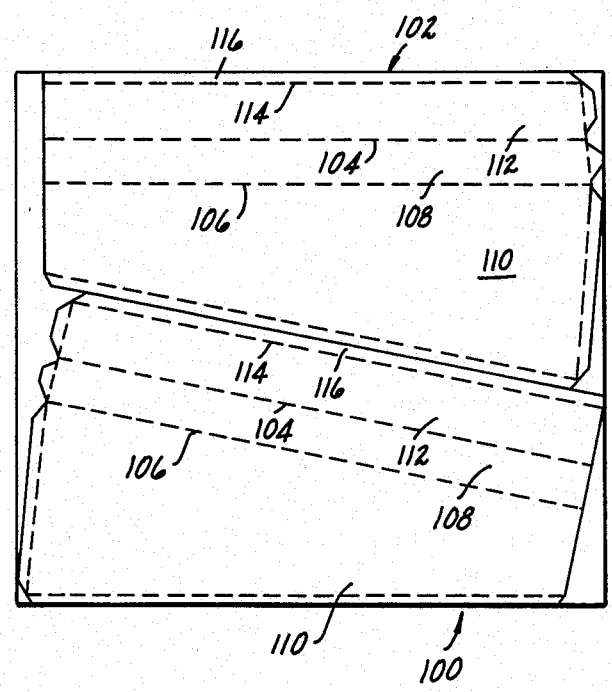
FIG. 19 is a layout in the flat of the two side panels of the vehicle body shown in FIG. 11.
Figure 20:
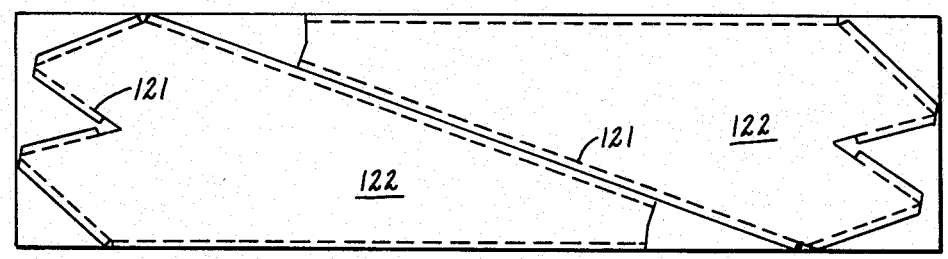
FIG. 20 is a layout in the flat of two floor panels for bodies having the configuration shown in FIG. 11.

The sheet metal blank from which the side panels 100,102 are formed is illustrated in FIG. 19 and the sheet metal blank from which the floor panel 122 is formed is illustrated in FIG. 20. As is the case with the previous embodiment illustrated, all of the edges of the side panels and the floor panels are straight lines and the bend lines are also straight lines. In the case of the floor panel 122, two such panels can be formed from a single sheet metal blank, as shown in FIG. 20, with very little waste. Each floor panel is bent along lines 121 to form flanges around the panel for attachment to the respective panel portions of the body. As shown in FIG. 19, the bend lines 106,104,114 are all parallel and, thus, the triangular beams along each side of the body are of uniform cross section. It will be appreciated, of course, that, depending upon the manner in which the body panels and the floor panels are interconnected (such as by bonding, riveting, welding, etc.), some or all of the flanges around the periphery of the flat panels can be eliminated. Likewise, the panel portions 112 can be formed as generally rectangular panels independently of the side panels 100,102; or, if desired, the panel portions 108,112 can be formed from a single rectangular panel and connected by suitable means to the panel portion 110.

Figure 11:
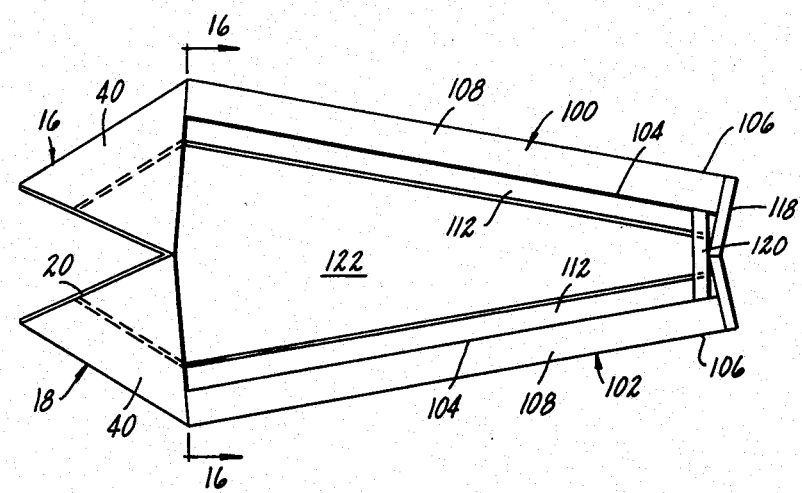
FIG. 11 is a top plan view of another modification of a vehicle body according to the present invention.
Figure 12:
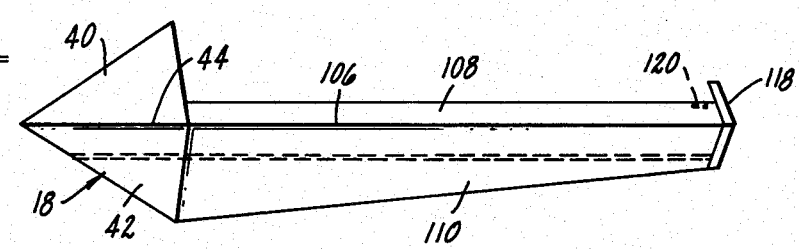
FIG. 12 is a side view of the vehicle body shown in FIG. 11.
Figure 13:
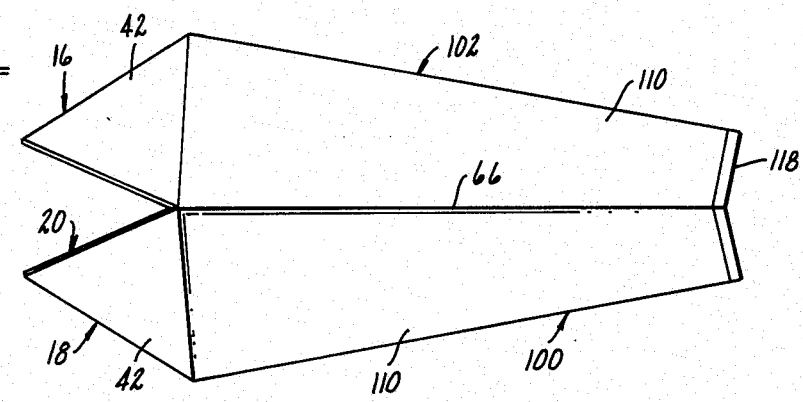
FIG. 13 is a bottom plan view of the body shown in FIG. 11.
Figure 14:
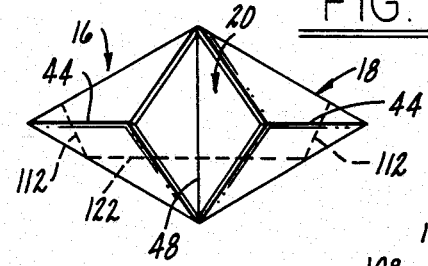
FIG. 14 is a rear end view of the body shown in FIG. 11.
Figure 15:
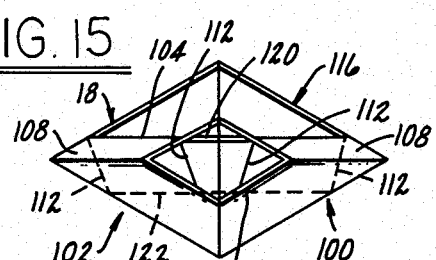
FIG. 15 is a front end view of the body shown in FIG. 11.
Figure 16:
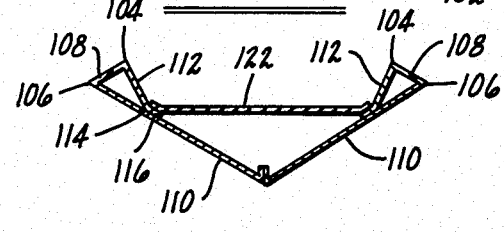
FIG. 16 is a sectional view taken along the lines 16—16 in FIG. 11.
Figure 17:
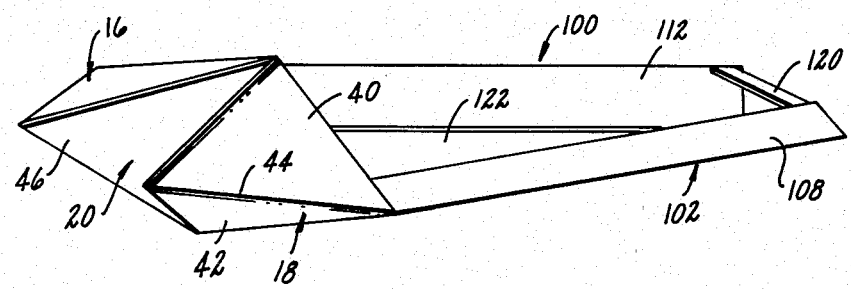
FIGS. 17 and 18 are perspective views of the body shown in FIG. 11 with the grille removed.
Figure 18:
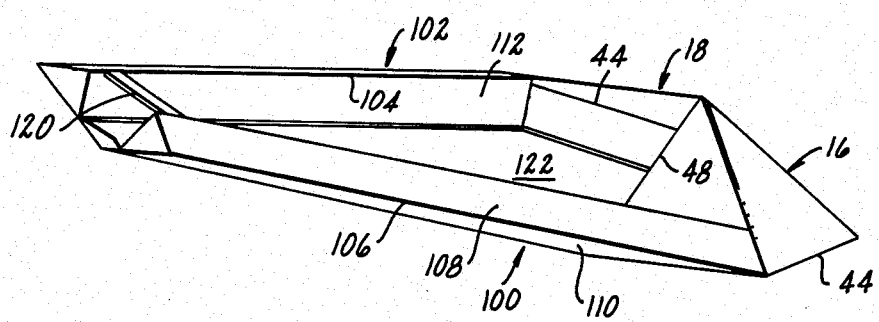
Figure 21:
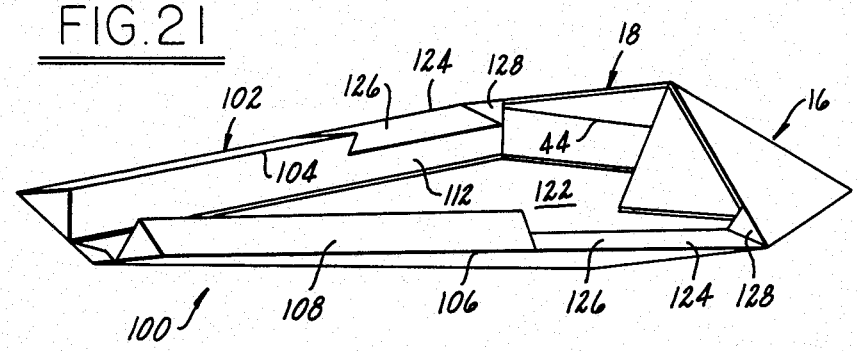
FIG. 21 is a perspective view of another modified form of body construction according to the present invention.

The vehicle body illustrated in FIG. 21 differs from that shown in FIGS. 11 thru 13 only in that the upper portion of each side panel is cut away or notched as at 124 to facilitate access into the vehicle. The sections of the side panels that are cut away are finished by closure panels 126,128. The access openings provided by the notched portions 124 are desirable in the case of an automobile body to reduce step-over height during entry and egress.

Figure 22:
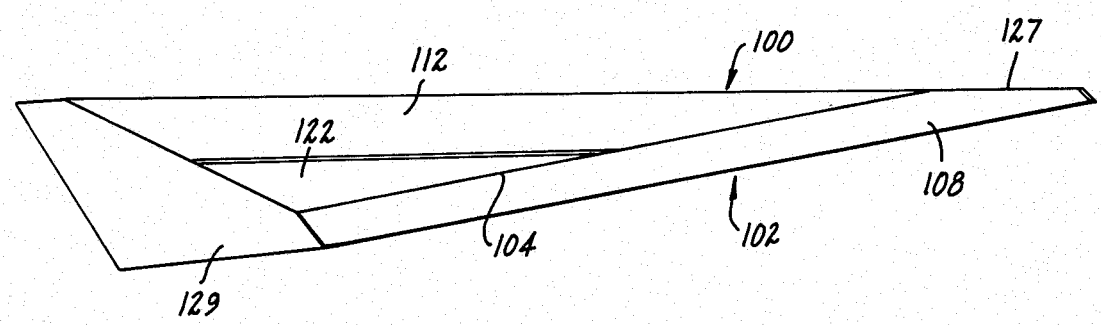
FIG. 22 is a perspective view of another vehicle body according to the present invention.

In the vehicle body illustrated in FIG. 22 the two side panels have the same general configuration as panels 100,102 and are likewise bent inwardly along their upper edges to form the panel portions 112 that provide the body with the triangular reinforcing beam along each side thereof. The forward end portions of the two front side panels are extended so that they can be connected directly together along the straight line 127 in the same manner as illustrated at 64 in FIG. 7. The forward ends of panels 100,102 are closed by cover 82 as in FIG. 1. The rear end of the body illustrated in FIG. 2 comprises a simple, generally triangularly-shaped panel 129 secured around its edges to the adjacent rear edges of the two side panels.

Figure 23:
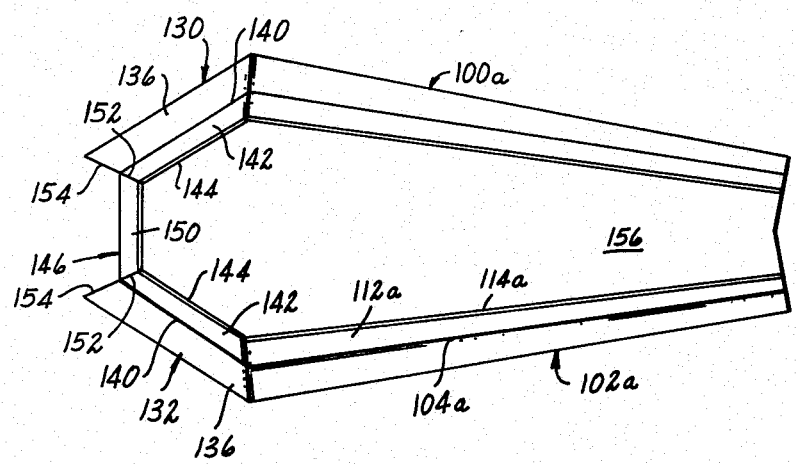
FIGS. 23, 24 and 25 are top, side and bottom plan views, respectively, of another vehicle body according to the present invention.
Figure 24:
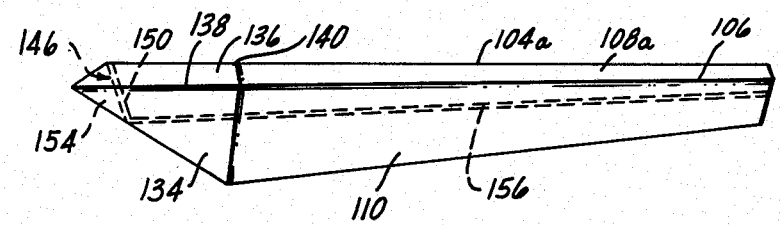
Figure 25:
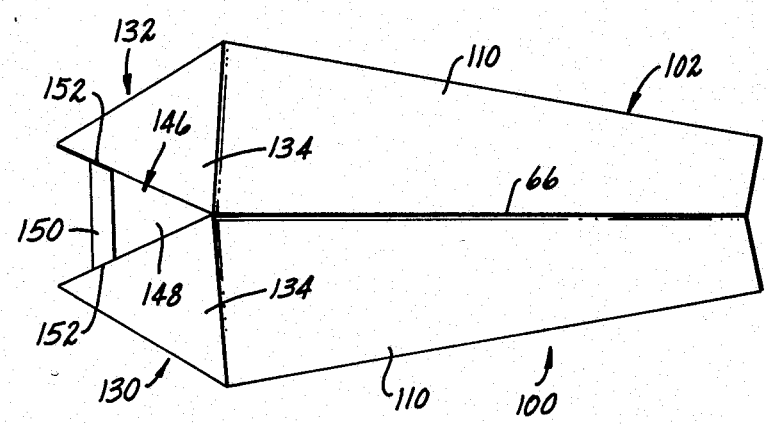

In the body illustrated in FIGS. 23 thru 25 the two front side panels 100a, 102a have the same general configuration as the corresponding panels of the vehicle body illustrated in FIGS. 11 thru 13. The two back side panels 130,132 differ slightly from the back side panels 16,18 of the body shown in FIGS. 11 thru 13. Each back side panel 130,132 has a triangularly-shaped lower portion 134 and an upper panel portion 136 of trapezoidal shape connected to the lower portion 134 by the straight bend line 138. Bend line 138 corresponds to bend line 44 illustrated in FIG. 6 and the panel portions 136 are truncated versions of the panel portions 40 in FIG. 6.

In this particular body the bend lines 104a, 114a converge slightly in a forward direction so that the triangular beams along each side of the vehicle body have a cross section which decreases gradually in a forward direction. The two back side panels 130,132 are likewise bent along lines 140 to form inwardly bent panel portions 142 which are flanged, as at 144, and connected to the lower portions of the inner faces of the back side panels to form triangular beams thereon similar in configuration to and forming rearward extensions of the triangular beams along the front side panels. The space between the opposed inner edges of the back side panels 130,132 is closed by a transversely extending panel 146 having a lower triangular portion 148 (FIG. 25) and an upper panel portion 150 of trapezoidal shape, the opposite side edges 152 of which are connected to the adjacent edges of the inwardly bent panel portions 142. The portions of each back side panel 130,132 extending rearwardly beyond panel 146 are closed by small triangular panels 154.

The floor panel 156 is secured to panels 100a, 102a, 130, 132, 146 around the lower edges of the inwardly bent panels which form the triangular beams. The front end of the vehicle body illustrated in FIGS. 23 thru 25 can be closed and reinforced in any suitable manner, such as by the grille 118 and the brace 120 illustrated in FIG. 11. It will be appreciated that, since the triangular beams along each side of the body decrease in cross sectional dimension in a forward direction, these beams impart to the body more progressive energy-absorbing characteristics when subjected to a front-end impact, further enhancing the wedge-shaped crash characteristics of the basic body. In other words, the front end of the body can collapse or distort progressively as a result of an axial impact so that the body does not behave as rigidly as the body with constant section side beams. Since the body is capable of absorbing the major portion of the energy resulting from a front end impact, this design provides the occupants of the vehicle body with a greater degree of safety in the event of a frontal collision.

Figure 26:
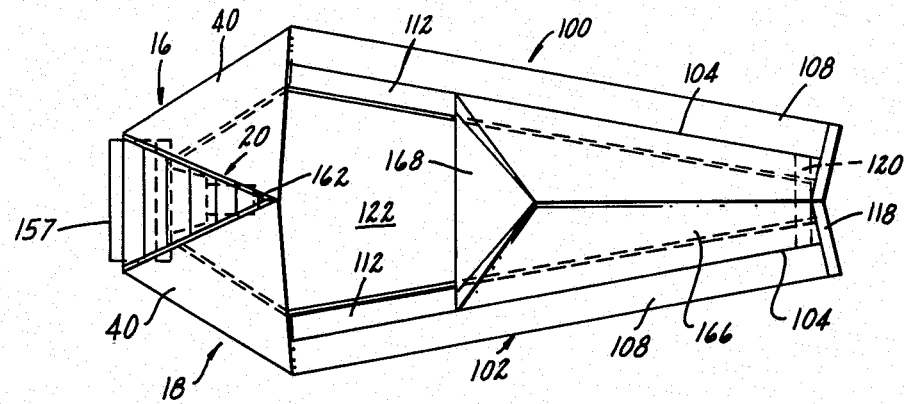
FIGS. 26 and 27 are top plan and side views, respectively, of the vehicle body shown in FIG. 11 with added modifications to adapt it for use as an automobile body having an engine at the rear end.
Figure 27:
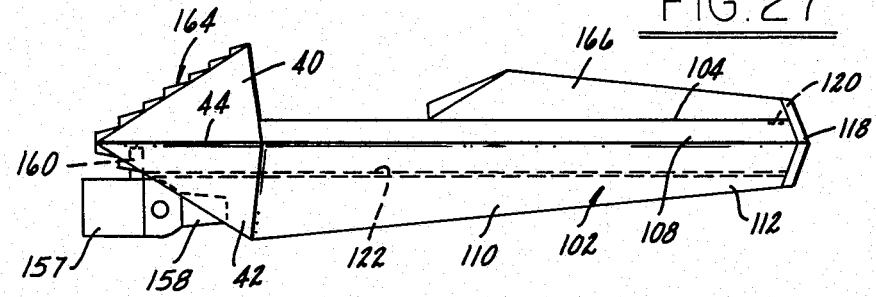

The basic body construction shown in FIGS. 26 and 27 is the same as that shown in FIGS. 11 thru 13 and includes the two front side panels 100,102 and the two back side panels 16,18 with the rear end panel 20 therebetween. The body is illustrated specifically for use as an automobile with a rear engine. The engine 157 and the transmission 158 are located within the vertically extending, V-shaped compartment formed by the central rear end closure panel 20. The engine and transmission are supported adjacent the rear end thereof by a pair of brackets 160 and adjacent the front end by an additional bracket 162. Panel 120 is notched as necessary at each side and at the forward end thereof to accommodate the engine and transmission. If desired, a louvered panel 164 can be secured to the downwardly inclined upper edges of panels 16,18 to serve as a cover for the engine and transmission. A hood 166 and a cowl 168 are mounted on the forward portion of the body to impart a sports car appearance to the vehicle.

Figure 28:
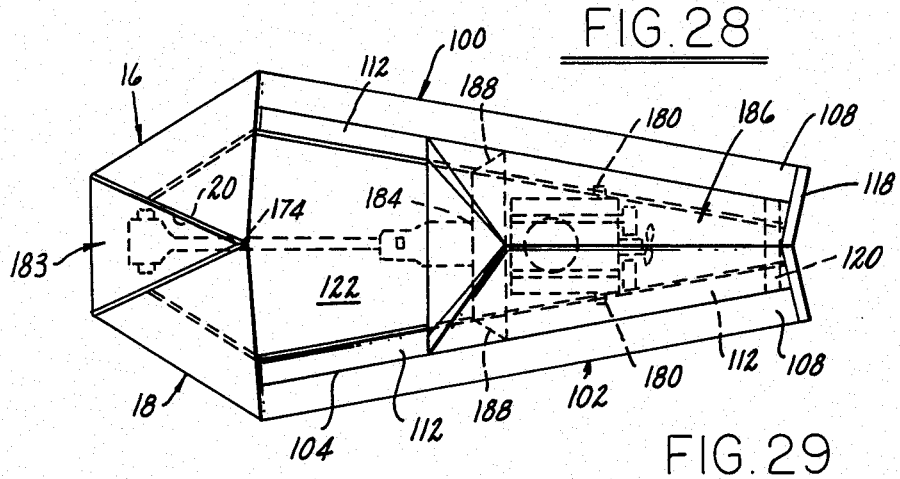
FIGS. 28 and 29 are top plan and side views, respectively, of the vehicle body shown in FIG. 11 adapted for use as an automobile body having an engine at the front end adapted for driving rear wheels on the automobile.
Figure 29:
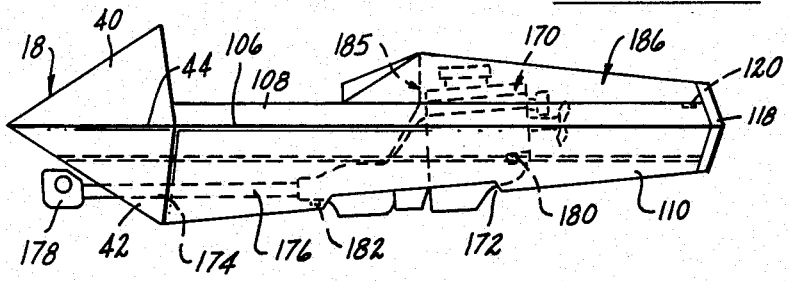

The body illustrated in FIGS. 28 and 29 is generally the same as that illustrated in FIGS. 26 and 27 and is modified slightly to accommodate an engine 170 adjacent the front end thereof rather than at the rear end thereof. Accordingly, the lower portions of front side panels 100,102 are cut away or notched as at 172 to accommodate the lower portions of the engine and transmission and the center rear panel 20 is notched as at 174 to accommodate the drive shaft 176 which extends to the differential and rear axle assembly 178. The front portion of the engine is supported by a pair of brackets 180 which are secured to the side panels 100, 102 at the junction of the beam-forming panels 112 with the lower portions 110 of the side panels. The rear end of the transmission is supported by a bracket 182 behind notch 172 at the junction of the lower edges of the two front side panels. The upper end of the V-shaped compartment defined by the central rear end panel 20 is closed by a flat cover 183. The floor panel 122 terminates at its forward end rearwardly of the engine above the front end of the transmission, as at 184. The passenger compartment is separated from the engine compartment by a panel 185 which extends upwardly from the forward edge 184 of floor panel 122. A hood and cowl panel assembly 186 overlies the engine compartment. The opposite side edges 188 of panel 185 are connected to panels 112 and to the inside of the hood and cowl panel assembly 186.

In the arrangement shown in FIGS. 30 thru 33 wherein the vehicle depicted is a boat, the forward portion of the vehicle body is the same as shown in FIG. 22 which consists of the side panels 100,102. As in FIG. 22, the forward upper edges of panel portions 108 are connected together as at 127 and the forward edges of panels 112 are connected together as at 127a. The rear end of the body comprises the two back side panels 16,18 and the rear end panel 20. The triangular beams formed along each side of the body by the inwardly and downwardly inclined panels 112 are extended around the inside of panels 16,18 by short panels 190 that are similarly inclined. The upper and lower edges of panels 190 are connected to the upper and lower panel portions 40,42 of panels 16,18 and, at their opposite ends, panels 190 are secured to the adjacent ends of panels 112 and to the opposite sides of panel 20. In the arrangement shown in FIGS. 30 and 31 an outboard motor 192 is mounted within the V-shaped compartment defined by panel 20 by means of a bracket 194. The front portion of the body is closed by a cover and a cowl panel assembly 196.

Figure 30:
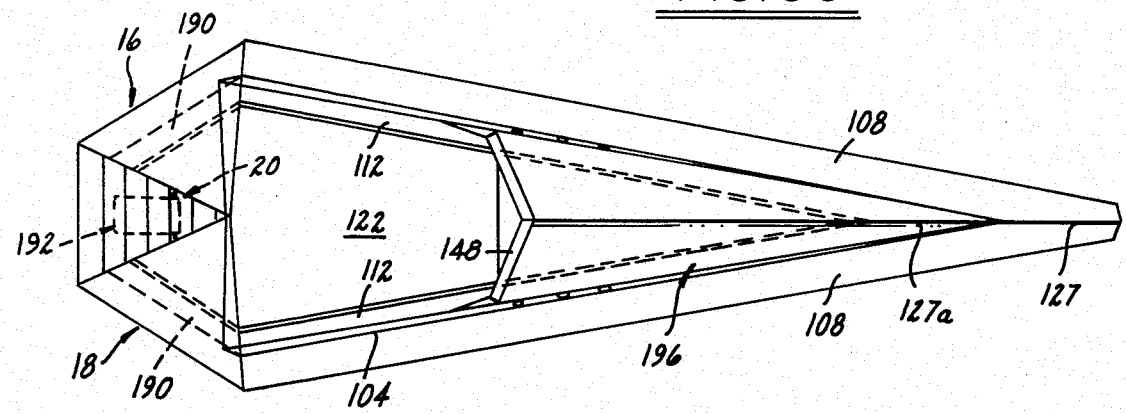
FIGS. 30 and 31 are top plan and side views, respectively, of a vehicle body according to the present invention adapted for use as a boat with an outboard motor.
Figure 31:
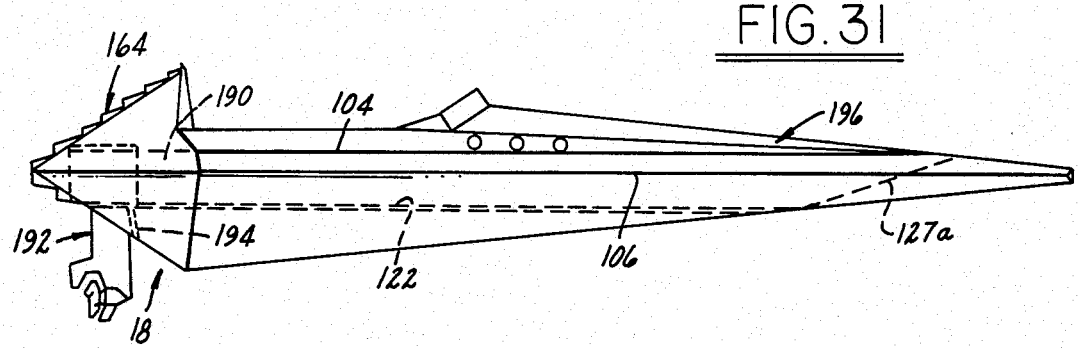
Figure 32:
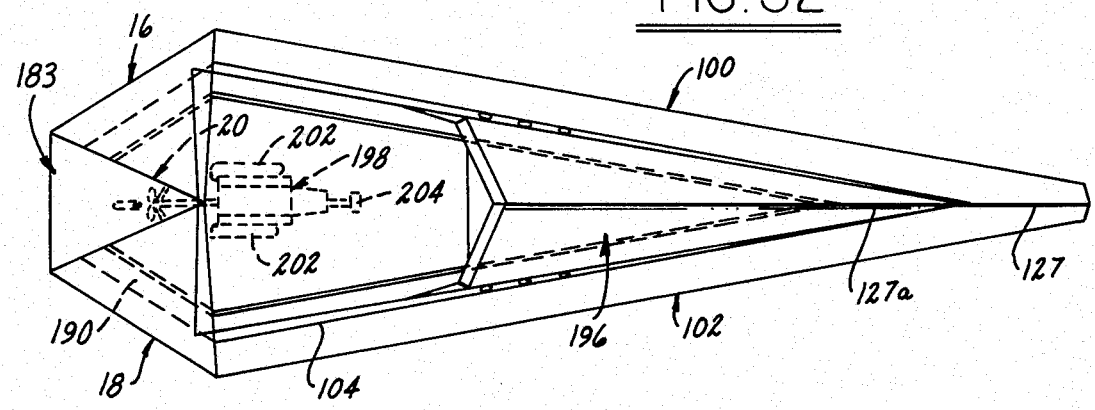
FIGS. 32 and 33 are top plan and side views, respectively, of a vehicle body according to the present invention adapted for use as a boat having an inboard engine.
Figure 33:
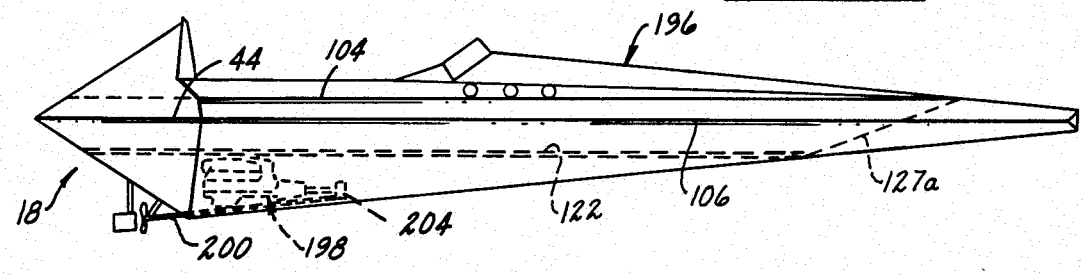

The boat illustrated in FIGS. 32 and 33 is generally the same as that shown in FIGS. 29 and 30 except that the engine 198 is mounted inboard at the lower rear ends of panels 100,102 and supported therein by suitable mounts (not illustrated). The center rear panel 20 is notched to accommodate the propeller shaft 200 and the engine exhaust and cooling conduits 202. Propeller shaft 200 extends rearwardly from the V-drive unit 204.

I claim:

1. A vehicle body comprising a pair of opposite front side panels formed of a self-supporting material and having rectilinear top and bottom edges, each side panel comprising an upper portion and a lower portion connected along a generally horizontal straight line extending longitudinally of the body, each upper panel portion being inclined laterally inwardly in an upwardly direction from said connection line and each lower panel portion inclined laterally inwardly and downwardly from said connection line, said side panels being generally mirror images of each other, the bottom straight edges of one panel being secured directly to the bottom straight edges of the other panel such that the portion of the body below said straight connection lines is of generally triangular shape in transverse cross section.

2. A vehicle body as called for in claim 1 wherein at least the forward portions of the top straight edges of the two panels are connected directly together so that the forward portion of the body above said straight connection lines is of generally triangular shape in transverse cross section.

3. A vehicle body as called for in claim 1 wherein the top edges of the two side panels are spaced apart and including a bracket extending transversely across the front end portion of the body and connected at its opposite ends with the spaced apart top edges of the two side panels.

4. A vehicle body as called for in claim 1 including a generally horizontally extending floor panel extending transversely between said lower panel portions above the bottom directly connected edges of said panels, the opposite longitudinal side edges of said floor panel being connected directly to the inner faces of said side panels to form with said side panels a triangular beam extending lengthwise of the vehicle body.

5. A vehicle body as called for in claim 5 wherein said side panels have rear ends spaced apart transversely of said body and including panel means extending transversely between and connecting the rear ends of said side panels, said floor panel extending rearwardly to and being connected with said rear panel means.

6. A vehicle body as called for in claim 1 wherein said side panels have rear ends formed with rectilinear edges extending generally vertically and including panel means closing the rear end of the body, said last-mentioned panel means extending transversely between and connected to said rear edges of said side panels.

7. A vehicle body as called for in claim 1 including a pair of opposite side back panels having rectilinear side edges, each back panel comprising an upper and lower panel portion connected along a generally horizontally extending straight line, the last-mentioned connecting lines converging in a direction rearward from the rear ends of the front side panels and terminating at their rear ends in transversely spaced relation, said back side panels being connected at their forward edges with the rear edges of the front side panels and a rear closure panel extending transversely between and connecting the rear edges of the two back panels.

8. A vehicle body as called for in claim 7 wherein the upper and lower panel portions of the back side panels are inclined to correspond with the inclination of the upper and lower panel portions of the front side panels, the connecting line of each back side panel forming a horizontal, laterally inwardly inclined extension of the connecting line on the front side panels.

9. A vehicle body as called for in claim 8 wherein said rear closure panel comprises two generally vertical panel portions which diverge in a direction rearwardly of the body from a central vertical line along which the last-mentioned panel portions are connected, the diverging portions of said last-mentioned panel portions being connected adjacent their rear edges with the rear edges of the converging upper and lower panel portions of the two back side panels.

10. A vehicle body as called for in claim 8 wherein said rear closure panel comprises upper and lower panel portions connected along a transversely extending horizontal line which joins at its opposite ends with the rear ends of the converging horizontal connecting lines of the two back side panels, the upper panel portion of the closure panel being inclined upwardly and forwardly and the lower panel portion of the closure panel being inclined downwardly and forwardly from the connection line therebetween, the opposite side edges of the rear closure panel coinciding with and being connected to the rear edges of the upper and lower panel portions of the back side panels.

11. A vehicle body as called for in claim 1 wherein the two front side panels converge in a forward direction.

12. A vehicle body as called for in claim 11 including a reinforcing panel at the inner side of each front side panel, said reinforcing panels extending downwardly from and connected to the upper panel portion of each front side panel and connected along its lower edge to the lower portion of each side panel, said reinforcing panel cooperating with the upper and lower panel portions of said front side panels to form a longitudinally extending triangular beam along each side of the body.

13. A vehicle body as called for in claim 12 including a generally horizontally disposed floor panel extending transversely between and connected to the lower panel portions of the two front side panels and cooperating therewith to form a longitudinally extending triangular beam along the inside lower portion of the body.

14. A vehicle body as called for in claim 13 wherein said floor panel is disposed at a level generally adjacent the lower ends of the triangular beams formed by said reinforcing panels.

15. A vehicle body as called for in claim 12 wherein said reinforcing panels are generally uniform in width and the triangular beams are of generally uniform cross section.

16. A vehicle body as called for in claim 12 wherein the upper panel portions of the two front side panels converge in a forward direction and the front end portions of the upper edges of the upper panel portions are connected directly together, the opposite reinforcing panels also converging in a forward direction and being connected together at their forward ends.

17. A vehicle body as called for in claim 12 wherein said reinforcing panels are of progressively decreasing width in a direction from back to front so that the triangular beams formed thereby are of a progressively decreasing cross section in a forward direction.

18. A vehicle body as called for in claim 12 wherein the upper panel portions of the front side panels and said reinforcing panels are spaced apart transversely at their forward ends and including bracket means extending transversely between and connecting the spaced forward ends of the front side panels.

19. A vehicle body as called for in claim 12 wherein the triangular beams on the inside of the front side panels extend substantially the full length of said front side panels.

20. A vehicle body as called for in claim 19 wherein the floor panel extends substantially the full length of the vehicle body.

21. A vehicle body as called for in claim 19 wherein the floor panel terminates at its front end substantially rearwardly of the front end of the front side panels.

22. A vehicle body as called for in claim 21 including a panel extending transversely between and connected to the two front side panels adjacent the forward end of the floor panel.

23. A vehicle body as called for in claim 12 wherein the rear end portions of the front side panels and said reinforcing panels are notched vertically downwardly from their upper edges to form access openings to the interior of the vehicle body.

24. A vehicle body as called for in claim 7 including reinforcing panels at the inner sides of each side front panel and each side back panel, the reinforcing panels extending downwardly from and connected to the upper panel portions of the front and back side panels and connected with the lower panel portions of the front and back side panels and cooperating therewith to form a triangular beam extending along each front side panel and each back side panel.

* * * * *